3,228,944
LUMIERGOLINE DERIVATIVES
Luigi Bernardi, Onofrio Goffredo, and Bianca Patelli, Milan, Italy, assignors to Società Farmaceutici Italia, Milan, Italy, a corporation of Italy
No Drawing. Filed June 4, 1963, Ser. No. 285,230
Claims priority, application Italy, June 8, 1962, 11,582/62
11 Claims. (Cl. 260—285.5)

Our invention relates to lumiergoline derivatives, that is to say compounds which can be obtained from the corresponding ergolines by ultra-violet irradiation which cause the addition of a molecule of water across the 9,10-double bond. The now compounds of the invention have therapeutic uses as discussed below.

Our invention has as an object the 6-methyl- and 1.6-dimethyl-lumiergolines having the formula:

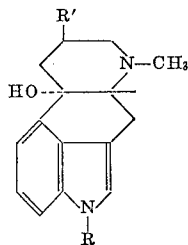

wherein:
R=hydrogen or methyl
R'=CONH$_2$, CH$_2$NHR''
R''=hydrogen or the radical of an aliphatic, cycloaliphatic, aromatic or heterocylic carboxylic or sulphoic acids having from 1 to 10 carbon atoms substituted or not by halogen atoms, free or alkylated amino-groups, intro-, hydroxy-, alkyl-, alkoxy-, thioether- or sulphonic groups.

A further object of our invention is the process of preparing the above compound wherein lysergamide or 1-methyl-lysergamide is irradiated with ultraviolet light in dilute aqueous organic acid solution so as to yield lumilysergamide or 1-methyl-lumilysergamide and, where appropriate, the lumilysergamide or 1-methyl-lumilysergamide thus obtained are reduced to lumilysergamine or 1-methyl-lumilysergamine, which may be acylated with the chloride or anhydride of the appropriate carboxylic or sulphonic acid.

The preparation of lumilysergamide or of 1-methyl-lumilysergamide is preferably carried out by irradiating a 5 to 15% aqueous solution of acetic acid containing lysergamide or 1-methyl-lysergamide with ultraviolet light over a period from 3 to 12 hours.

The methylation of the nitrogen atom in the 1-position of the ergoline ring may be carried out before or after the irradiation with ultraviolet light. The methylation consists essentially in reacting the ergoline with a methyl halide, preferably methyl iodide, in liquid ammonia and in the presence of metallic potassium.

The reduction of lumilysergamide or 1-methyl-lumilysergamide may be carried out by any reducing agent capable of reducing the amide group into an amine group, preferably lithium aluminum hydride. The reaction may be carried out at room temperature, but it is preferably completed in the warm. It should be carried out in the presence of a solvent, inert towards the reducing agents, such as an ether, for example diethyl ether, diproply ether, tetrahydrofuran, ethylene glycol dimethyl ether and their analogues. The resulting lumilsergamine or 1-methyl-lumilysergamine may be isolated as such in crude crystalline form by concentrating the reaction mixture and subsequent cooling. Purification occurs readily by recrystallization.

The corresponding N-acyl derivatives are prepared by reacting the lumilysergamine or 1-methyl-lumilysergamine with an acylating agent such as the anhydride or the chloride of the appropriate organic carboxylic or sulphonic acid, optionally in the presence of a tertiary amine, such as pyridine, diethylaniline, or triethylamine, etc.

Typical examples of acyl derivatives, prepared according to the invention, are the derivatives of the following acids: acetic, trimethyl-acetic, propionic, butyric, valerianic, hexanoic, heptanoic, octanoic, decanoic, cyclopentanecarboxylic, cyclopentylpropionic, succinic, benzoic, 2-nitro-benzoic, 3-chloro-benzoic, salicylic, toluic, 2-methoxy-benzoic, methyl-thiosalicylic, 2,6-dimethoxy-benzoic, 3,4,5-trimethoxy-benzoic, phenylpropionic, phenoxy-acetic, α-phenoxypropionic, diethylcarbamic, chloracetic, N,N-diethylaminoacetic, α-phenoxy-butyric, butyl-carbonic, isobutyl carbonic, ethyl carbonic, propyl carbonic, isopropyl carbonic, N-ethyl-anthranilic, N,N-diethyl-anthranilic, p-toluenesulphonic, methanesulphonic, pyrrol-2-carboxylic, N-pyrrolidine-acetic, nicotinic, isonicotinic, pyridine-3,5-dicarboxylic, pyridine-3-sulphonic, lutidinic, pyridine-acetic, picolinic, pyridine-3-isobutyric, piperidine-2-carboxylic, 3- and 4-piperidyl-acetic, indole-3-acetic, imidazole-4-acetic, pyrazinoic, piperazine-1-acetic, piperazine-2-dimethyl-aminoethyl-1-carboxylic, pyramidine-4-carboxylic, pyramidine-5-bromo-2-carboxylic, pyramidine-5-amino-2-methyl-4-carboxylic, furan-3-methyl-2-carboxylic, furan-2-carboxylic, pyran-2,6-dicarboxylic, thiophene-3-carboxylic, thiophene-2-4,disulphonic, isooxazole-3-carboxylic, isooxazole-5-amino-3-methyl-4-carboxylic, N-morpholinoacetic, thiomorpholino-3,5-dicarboxylic, thiazole-2-carboxylic, thiazole-4-methyl-2-carboxylic, thiazole - 2-amino-4-carboxylic, thiazole-2-hydroxy-4-carboxylic, and thiazole-2-acetic acids.

The new compounds of the invention are crystalline solids, soluble in the usual organic solvents and in acids. They have a good oxytocic, antienteraminic, adrenolytic, hypotensive, and sedative activity, and a low toxicity. In human therapy, they can be administered orally, intramuscularly, subcutaneously and intraveneously, and may be particularly employed in internal medicine (migraine, cephalea, nervous tachycardia, atony of the stomach, hyperthyroidism, Basedown disease, trigeminal neuralgia, peripheral vascular diseases) and in obstetrics and gynecology (metrorrhagia, puerperium, curettage, abortion, pregnancy toxemia, uterine atony).

The clinical doses for humans vary from 0.1 to 5 mg. per day of active compounds, according to the case. The therapeutic compositions usually employed include one or more of the new compounds of the invention in a certain amount of solid or liquid therapeutically acceptable carrier. The compositions can be prepared as tablets, powders, pills and other dosage unit forms suitable for oral administration. Liquid diluents, duly sterilized, are employed for parenteral administration. Many an excipient may be employed, among which the most suitable are starch, lactose, talc, and magnesium stearate. Tablets may be prepared with substances usually employed in pharmaceutical practice, or containers, such as gelatine capsules, may be used.

The following examples are to illustrate, but not to limit, the invention:

*Example 1.—Lumilysergamide*

10 g. of lysergamide dissolved in 1 liter of 10% acetic acid are irradiated by an ultraviolet lamp for 6 hours until the fluorescence has completely disappeared and the solution takes up a dark color. The solution is made alkaline with ammonia and extracted completely with chloroform-methanol 1:1 mixture. The extracts are dried over anhydrous sodium sulphate and concentrated to dryness in vacuo. The residue is taken up with chloroform and chromatographed over an alumina column. The first fractions, which are slightly fluorescent and contain some of the starting material, are discarded. The eluate is evaporated in vacuo to dryness. The residue is recrystallized from benzene. 8.5 g. of lumilysergamide, melting at 270–271° C., are obtained. $[\alpha]_D^{20} = -16°$ (c.=0.4 in pyridine).

*Example 2.—1-methyl-lumilysergamide*

The preparation is carried out in the same way as in Example 1, but by employing 1-methyl-lysergamide as starting material instead of lysergamide. 1-methyl-lumilysergamide melting at 247–250° C. is obtained.

*Example 3.—Lumilysergamine*

7 g. of lumilysergamide obtained by irradiating lysergamide with ultraviolet light are refluxed for 3 hours with a solution of 8 g. of lithium aluminum hydride in 2000 cc. of anhydrous tetrahydrofuran. After cooling, aqueous tetrahydrofuran is added to the mixture to destroy the excess reducing agent, and the mixture is filtered. After evaporation of the tetrahydrofuran solution to a small volume, the product is precipitated by adding ether. 4.7 g. of lumilysergamine, melting at 235–237° C., are obtained.

*Example 4.—N-benzoyl-lumilysergamine*

0.1 cc. of benzoyl chloride is added to 0.130 g. of lumilysergamine in 1.5 cc. of pyridine cooled to −10° C. The mixture is kept at −10° C. for 10 minutes, at room temperature for 30 minutes, and is then diluted with a small quantity of methanol and 30 cc. of water and kept at room temperature for one hour. The mixture is extracted with chloroform, washed with sodium hydroxide solution and then with water, and the solvent is distilled off. Upon addition of acetone-petroleum ether, 0.050 g. of N-benzoyl-lumilysergamine, melting at 248–250° C., crystallize from the residue.

*Example 5.—N-nicotinoyl-lumilysergamine*

The preparation is carried out in the same way as in Example 4, but employing nicotinic acid chloride. N-nicotinoyl-lumilysergamine, melting at 268–270° C., is obtained.

*Example 6.—N-acetyl-lumilysergamine*

The preparation is carried out in the same way as in Example 4, but employing acetic anhydride. N-acetyl-lumilysergamine, melting at 238–240° C., is obtained.

*Example 7.—N-carbethoxy-lumilysergamine*

The preparation is carried out in the same way as in Example 4, but employing ethyl-chlorocarbonate. N-carbethoxy-lumilysergamine, melting at 138–140° C., is obtained.

*Example 8.—1-methyl-lumilysergamine*

0.700 g. of 1-methyl-lumilysergamide are refluxed for 3 hours with 100 cc. of tetrahydrofuran and 0.700 g. of lithium aluminum hydride. After having destroyed the reducing agent excess by adding aqueous tetrahydrofuran, the solution is filtered and distilled in vacuo. The residue crystallized by adding ethyl ether, yields 0.380 g. of 1-methyl-lumilysergamine, melting at 198–200° C.

*Example 9.—N-benzoyl-1-methyl-lumilysergamine*

To a solution of 0.300 g. of 1-methyl-lumilysergamine in 2 cc. of pyridine, cooled to −10° C., 0.2 cc. of benzoyl chloride are added. The mixture is kept at room temperature for 30 minutes, diluted with a small quantity of methanol and 60 cc. of water, extracted with chloroform and the chloroform layer is washed with a 1% caustic soda solution. After distilling off the solvent, the residue is recrystallized from acetone-petroleum ether. 0.320 g. of N-benzoyl-1-methyl-lumilysergamine, melting at 193–195° C., are obtained.

*Example 10.—N-nicotinoyl-1-methyl-lumilysergamine*

The preparation is carried out in the same way as in Example 9. N-nicotinoyl-1-methyl-lumilysergamine, melting at 238–240° C., is obtained.

*Example 11.—N-carbethoxy-1-methyl-lumilysergamine*

The preparation is carried out in the same way as in Example 9. N-carbethoxy-1-methyl-lumilysergamine melting at 75–78° C. is obtained.

We claim:
1. 1-methyl-lumilysergamide.
2. Lumilysergamine.
3. 1-methyl-lumilysergamine.
4. N-acetyl-lumilysergamine.
5. N-carbethoxy-lumilysergamine.
6. N-benzoyl-lumilysergamine.
7. N-nicotinoyl-lumilysergamine.
8. N-benzoyl-1-methyl-lumilysergamine.
9. N-nicotinoyl-1-methyl-lumilysergamine.
10. N-carbethoxy-1-methyl-lumilysergamine.
11. A compound of the formula:

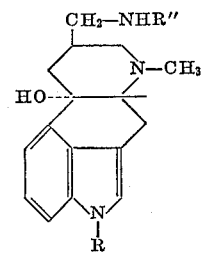

wherein
R is selected from the group consisting of hydrogen and methyl:
R″ is selected from the group consisting of hydrogen and
   (a) an acyl group of an unsubstituted saturated aliphatic acid of from 1 to 4 carbon atoms;
   (b) an acyl group of a substituted saturated aliphatic acid of from 2 to 4 carbon atoms, in which the substituent is selected from the group consisting of chloro, diethylamino, phenoxy and phenyl;
   (c) an acyl group of an alkylcarbonic acid in which the alkyl group is from 1 to 4 carbon atoms;
   (d) an acyl group of a diethylcarbamic acid;
   (e) an acyl group of saturated cycloaliphatic acids of not more than 8 carbon atoms wherein the cycloaliphatic ring is of 5 carbon atoms;
   (f) an acyl group of an aromatic acid selected from the group consisting of substituted and unsubstituted benzoic acid in which the substituent is selected from the group consisting of chloro and methoxy;
   (g) an acyl group of an heterocyclic acid selected from the group consisting of nicotinic, isonicotinic, pyrazinoic, pyrrolidineacetic and morpholineacetic acid, and
   (h) an acyl group of toluenesulfonic acid.

References Cited by the Examiner
FOREIGN PATENTS
786,138  11/1957  Great Britain.

OTHER REFERENCES
Burger: Medicinal Chemistry, 2d ed., pp. 585–6 and 622 (1960).
Stoll: Chemical Reviews, vol. 47, pp. 197–218 (1950).

NICHOLAS S. RIZZO, *Primary Examiner.*